United States Patent [19]

de Weaver, III

[11] 4,409,856

[45] Oct. 18, 1983

[54] PROPULSION SYSTEM

[76] Inventor: Fred de Weaver, III, 1403 Tampa Ave., Dayton, Ohio 45408

[21] Appl. No.: 229,681

[22] Filed: Jan. 29, 1981

[51] Int. Cl.$^3$ ............................................. F16H 27/00
[52] U.S. Cl. .................................. 74/84 R; 74/5.37; 74/84 S
[58] Field of Search ................... 74/84 R, 84 S, 5.22, 74/5.34, 5.37; 244/62, 172; 180/7 R

[56] References Cited

U.S. PATENT DOCUMENTS

| | | | |
|---|---|---|---|
| 1,953,964 | 4/1934 | Laskowitz | 74/14 |
| 3,006,581 | 10/1961 | Langman | 74/5.37 X |
| 3,203,644 | 8/1965 | Kellogg, Jr. | 180/7.1 X |
| 3,555,915 | 1/1971 | Young, Jr. | 74/84 |
| 3,584,515 | 6/1971 | Matyas | 74/84 |
| 3,653,269 | 4/1972 | Foster | 74/84 |
| 3,807,244 | 4/1974 | Estrade | 74/84 S |
| 3,968,700 | 7/1976 | Cuff | 74/84 S |
| 3,998,107 | 12/1976 | Cuff | 74/84 S |
| 4,095,460 | 6/1978 | Cuff | 74/84 S |

FOREIGN PATENT DOCUMENTS

| | | | |
|---|---|---|---|
| 2825490 | 12/1979 | Fed. Rep. of Germany | 244/62 |
| 1308410 | 9/1962 | France | 74/5.22 |

Primary Examiner—Allan D. Herrmann
Attorney, Agent, or Firm—Biebel, French & Nauman

[57] ABSTRACT

A propulsion system for converting rotary motion into unidirectional motion and consisting of a frame, a pair of counterrotating lower members rotatably mounted to the frame containing damping elements, a pair of upper members containing damping elements rotatably mounted to the frame and positioned above the lower members, each at an angle to the disk so that each contacts a surface of the member below it at a single point, and a motor and drive train for driving the lower members. Each lower member includes a pair of studs mounted at its periphery which engage radially extending posts mounted to its corresponding upper cylinder so that rotation of the lower member causes the upper member to rotate in the same sense damped and at the same angular velocity. The super position of the damped upper members upon the damped lower members generates unbalanced centrifugal forces which result in a constant unidirectional resultant force.

24 Claims, 4 Drawing Figures

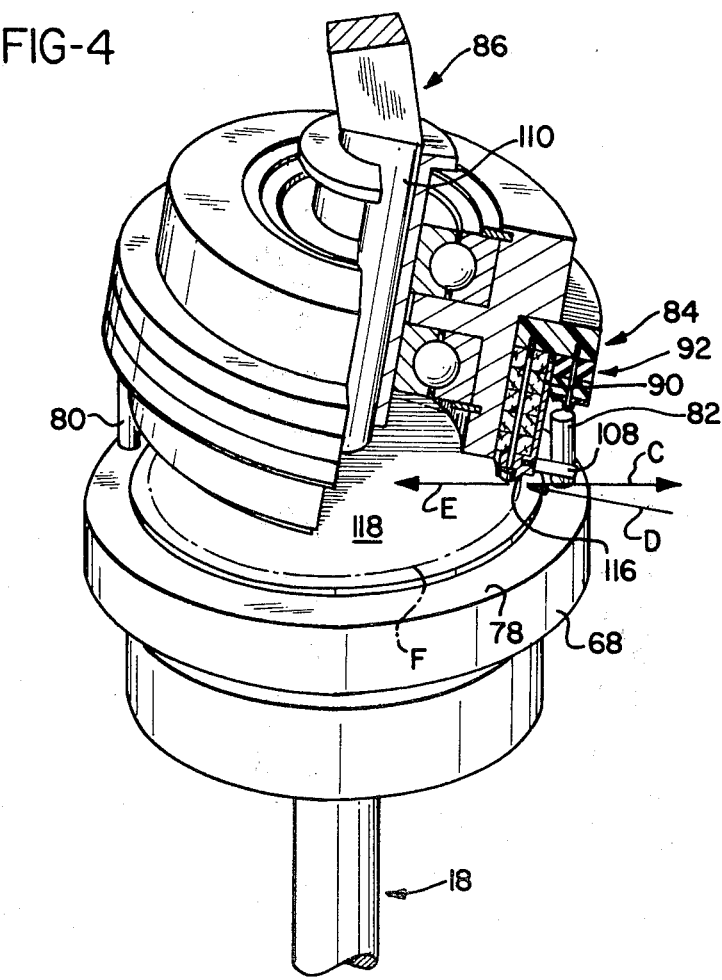

PROPULSION SYSTEM

BACKGROUND OF THE INVENTION

1. Field of the Invention

This invention relates to propulsion systems and, in particular, is related to propulsion devices which utilize the centrifugal forces produced by gyrating masses to produce a single resultant unbalanced centrifugal force which acts in one direction.

2. Description of the Prior Art

There are many types of known propulsion devices which convert centrifugal into linear force so that the device does not need a medium against which to push. For example, U.S. Pat. Nos. 4,095,460; 3,998,107; 3,968,700; and 1,953,964 disclose devices in which a plurality of weights are connected to a central hub by a pivoting linkage. The weights are received within an outer circumferential member which spins about a first axis. The hub to which the weights are connected by the pivoting linkage rotates about a second axis which is parallel to but not co-linear with the first axis. As a result, the distance of a selected weight from the center of rotation varies as the weight rotates. This causes a variation in angular momentum and creates a resultant force which is variable and unidirectional. By moving the location of the second axis relative to the first axis, the resultant unidirectional forces can be varied in magnitude and direction to propel a vehicle in which the device is mounted.

A variation of this concept is disclosed in U.S. Pat. Nos. 3,807,244 and 3,584,515. These two patents each disclose a device in which a plurality of masses are rotated about a fixed axis. The masses encounter a constraining member which extends at least partially about the periphery of the axis of rotation and serves to vary the distance the weight extends from the axis of rotation. In this fashion, the distance of a selected weight from the axis of rotation varies as the weight revolves about the axis. This creates a resultant unidirectional force which can be controlled to propel a vehicle within which the device is mounted.

In U.S. Pat. Nos. 3,653,269 and 3,555,915, there is disclosed devices for generating unidirectional thrusts from rotating members which utilizes gyroscopic forces. Each device disclosed consists of spinning members which are mounted on a rotating member so that the axis of the spinning members are normal to the axis of the rotating member. In the former patent, the axes of the spinning members are rotated about a third axis which is normal to the axis of the larger rotating member which carries the spinning members. In both devices, the combination of the gyroscopic forces generated by the spinning members and the centrifugal forces generated by the rotating members coact to generate a unidirectional thrust which does not require a fixed surface against which to push for propulsion.

There are several disadvantages with the above-described prior art devices. For example, these devices typically require a number of complex gearing systems, some of which have to be mounted on rotating members. In addition, some of the prior art devices require a plurality of heavy weights which add to the overall weight of the device and require additional reinforcing members in the supporting frame of the device, resulting in increased expense. Such devices are typically large and bulky and would be difficult to mount safely in a small vehicle. At the same time, their large size makes it difficult for them to be positioned to direct the resultant unidirectional force to guide the vehicle within which they are mounted. Further, these devices generate a resultant force that is cyclic thereby inducing vibratory loads within the device.

Accordingly, there is a need for a device which converts rotational forces to a constant unidirectional force which is relatively compact, does not require a plurality of heavy spinning weights, and does not require complex gearing mechanisms. In addition, there is a need for a device in which the constant unidirectional force which is generated can be directed and controlled easily.

SUMMARY OF THE INVENTION

The present invention encompasses a propulsion system that produces a centrifugal force by superimposing a mass (weight) on a rotating member at a predetermined distance radially from the center of rotation of the member to cause an unbalanced condition on the member resulting in a centrifugal force being generated in the member. To fully understand the physical principles surrounding this system, an examination of the mathematical equations used to calculate this centrifugal force and propulsion force are as follows:

$$F = W(\omega)^2 R/G \tag{1}$$

$$F_p = F - F' \tag{2}$$

where,
F = Centrifugal Force
F' = Reaction Force
R = Radius
$F_p$ = Propulsion Force
W = Weight of out of Balance
$\omega$ = Angular Velocity
G = Acceleration Due to Gravity Examining equation (1), the magnitude of the centrifugal force depends upon the size of the weight that is superimposed on the rotating member, the radius of this weight from the center of rotation and the angular velocity of the rotating member. In accordance with Newton's Third Law of Motion (For every action, there is an equal and opposite reaction), the generation of the centrifugal force caused by the weight being superimposed on the rotating member, a reaction force F', is produced equal in magnitude to the centrifugal force but acts opposite in direction.

Examining equation (2), when F = F', this device will not move. To overcome this difficulty, F − F' must be greater than 0, or F' must be less than F. The invention reduces F' by providing a method of isolating F' in the weight that is superimposed on the rotating member. In order to obtain a large propulsive force, the efficiency of the isolation system to reduce F' considerably is the controlling factor.

The present invention provides a propulsion system, for converting rotational forces into a constant unidirectional, unbalanced linear force and does not require any reactive engagement with a supporting surface or a fluid medium. The present invention utilizes a single motive source and therefore is less complicated than those prior art devices utilizing a plurality of motors or engines. In addition, the preferred form of the present invention utilizes only two sets of weights, each of which rotates about essentially a single axis. Thus, the present invention does not require a plurality of spinning weights or large spinning disks required of prior devices of this type. In addition, the present invention requires a relatively simple gear train to link the motive source with the two sets of rotating weights and thereby eliminates the need for extensive and complex gearing systems required on many prior art devices.

The propulsion system of the present invention includes at least one force generating unit having upper and lower gyrating masses, which interact to create a resultant unidirectional force. The placement of the upper rotating mass upon the lower rotating mass induces an unbalanced condition in the lower rotating mass resulting in a constant centrifugal force in the lower rotating mass at the point of contact of the upper and lower rotating masses. Since both upper and lower masses gyrate in the same direction, unwanted rotational torques may be created which would cause the device to rotate instead of moving in a straight line. These rotational torques can easily be cancelled by creating counterrotational torques through a second set of gyrating masses having an axis of rotation substantially parallel to that of the first set of upper and lower masses.

In a preferred embodiment, a second force generating unit, rotating in a direction opposite that of the first, is added to the system. This second unit has a mass equivalent to that of the first unit so that equal rotational torques are generated which oppose each other and are thereby cancelled. The two units are arranged so that the resultant forces act in the same direction and therefore are additive.

Thus, the propulsion system of the present invention includes a frame, a pair of lower members mounted to the frame to rotate about first and second axes, a pair of upper members, each positioned above a lower members and mounted to the frame to rotate about third and fourth axes skewed to the first and second axes, a single motor for rotating lower members in opposite directions about their respective first and second axes through a bifurcated drive train, and complementary connecting linkage carried by the lower members and upper cylinders so that the lower members may engage and drive the upper members. The lower members each include a flat camming surface which faces upward and the lower portion of such upper members each includes a bottom rim, a portion of which rests upon the camming surface.

The upper members are rotatably mounted on upper shafts which are themselves rotatably mounted to the frame. The control axes of the lower portions of the upper shafts comprise the third and fourth axes about which the upper members rotate. The lower disks are each mounted on a lower shaft which in turn is rotatably mounted to the frame. The axes of rotation of the lower shafts comprise the first and second axes about which the lower members rotate.

The third and fourth axes are skewed with respect to the first and second axes so that the upper members are tilted with respect to the lower members. The bottom rims of the upper members contact the lower disks above which they are mounted at a single point. As the upper cylinders and lower disks are rotated during operation of the propulsion apparatus, this point of contact does not change relative to the third and fourth axis of the upper shafts. Preferably, the third and fourth axes are skewed with respect to the first and second axes at an angle of about 3°.

The upper members are preferably made of aluminum or other metal and are cylindrical in shape. However, each includes a non-metallic damping element which isolates a segment of the upper member having the bottom rim from the remainder of the member so that there is no metal-to-metal contact therebetween. The internal damping of these members created by the inclusion of these damping elements is necessary for the creation of the unidirectional force.

Similarly, the lower members, preferably made of aluminum and disk-shaped, are isolated from the drive train by a non-metallic damping element so that there is no metal-to-metal contact. This isolation of the lower member is also necessary for the creation of the unidirectional force.

The propulsion system preferably is powered by a single electric motor, which is centrally mounted in a lower portion of the frame, although any type of prime mover can be used that produces rotary motion. The motor drives a three-way gear unit which has two output shafts rotating in opposite senses to one another. The two output shafts of the three-way gear unit each power a separate right angle gear unit which ultimately rotates the lower shafts.

The connecting linkage mounted on the lower members consists of at least one pair of studs mounted in the camming surface and extending upwardly on opposite sides of the upper member. Each pair of studs mounted on the lower member must be on a common diameter. The connecting linkage of the upper member includes a corresponding pair of posts which extends outwardly from its periphery and are positioned to engage the studs mounted in the lower members. Each pair of posts must also lie on a common diameter. When the lower disks are rotated by the motor, each pair of studs engages its complementary pair of posts so that the lower members cause the upper cylinders to rotate at the same angular velocity.

The upper shafts which carry the upper members are journaled into cylindrical bearings which are rotatably mounted within the frame. The upper shafts slidably engage the cylindrical bearings and can be adjusted relative to the bearings by means of a bolt and lock-nut combination. By adjusting the position of the upper shafts relative to the bearings, the positions of the upper members can be adjusted in a horizontal plane relative to the lower members. The purpose of this adjustment is to locate the top member horizontally so that the point of contact will be radially equal about the center of the shaft each rotates around. When this is accomplished, each complete revolution of the members, the point of contact on the top and bottom member are identical.

Each of the bearings which carry the upper shafts includes a portion extending above the frame which carries a sprocket wheel. The sprocket wheels are joined to each other and to a master wheel by means of a timing belt. The master wheel in turn may be controlled by a steering wheel or other manually operable device to cause the sprocket wheels and thus the bearings to rotate relative to the frame. Point of contact between the members must be maintained in the same angular position on both rotating assemblies.

In a preferred embodiment, the upper members each comprise a top cylinder member, a bottom cylinder member which terminates in the bottom rim, and a non-metallic cylinder coupler which is carried by the top cylinder member and in turn retains the bottom cylinder member. The non-metallic cylinder coupler functions as the damping element for the upper cylinders and includes a nylon annulus which is press-fitted over the top cylinder member. The bottom cylinder member includes a recess which retains a non-metallic bolt which is threaded into the nylon annulus. The space between the nylon annulus and the bottom cylinder member is filled with a plurality of non-metallic rings, preferably made of cork, felt, or rubber to eliminate metal-to-metal contact between the top cylinder member and the bottom cylinder member.

Similarly, each lower member includes a lower disk and a non-metallic coupler disk mounted to the lower disk, preferably made of a phenolic resin. The coupler disk is in turn mounted to a mounting disk which is driven by the drive train. Thus, the lower disks are isolated from the drive train by a damping element that eliminates metal-to-metal contact.

The camming surface of the lower disks preferably includes a circular pad made of rubber and of a sufficient size so that the point of contact of the bottom rim of the bottom cylinder member on the camming surface always engages a portion of the rubber pad as the upper member and lower member rotate.

In order to provide a secure engagement of the upper member against the lower member, a biasing device such as a coil spring is placed over the upper shafts between the frame and the top cylinder member to push or force the upper member downwardly against the lower member and prevent the upper member from vibrating away from the lower member along the upper shaft.

From experiments conducted on this device, it is believed that at the point of contact the upper member superimposes its weight on the lower member thereby creating an unbalanced condition in the lower member which results in the centrifugal force F being induced into the lower member. The lower member induces a centripetal force or reactive force F′ into the upper member. In order for the forces F and F′ not to cancel each other, some means of isolation must be used to prevent F′ from entering the frame work then the upper shafts located on the third and fourth axes. The more F′ can be isolated from the top shafts, the larger the propulsion force. The net constant propulsive force would equal F−F′.

It is essential that the engaging linkage be designed so that the upper members and lower members are rotating at the same angular velocity. The radius at the point of contact must also be equal for the lower members and the upper members.

The direction of the resultant unidirectional force can be varied by rotating the master wheel which in turn rotates the sprocket wheels by means of the timing belt which interconnects the wheels. By rotating the sprocket wheel, the bearings containing the upper shafts are rotated thereby rotating the upper shafts and changing the position of the point of contact relative to the frame. Since the resultant unidirectional force is always in a direction extending from the point of contact to the axis of rotation of each upper shaft, the rotational movement of the point of contact about that axis changes the direction of the resultant unidirectional force. If both upper members and upper shafts are oriented so that their respective points of contact coincide, the resultant unidirectional forces are in the same direction and have an additive effect which results in an even larger unidirectional force in the given direction. Thus, the present invention provides a system which generates a unidirectional force from rotational forces independently of the external environment.

Accordingly, it is an object of the present invention to provide a propulsion system which requires only a single power source to operate the system; a propulsion system which requires only two sets of rotating members which rotate about essentially two axes; and to provide a propulsion system which includes a relatively simple power train and relatively uncomplicated gearing mechanisms to reduce the overall complexity and expense of the system.

Other objects and advantages of the invention will be apparent from the following description, the accompanying drawings and the appended claims.

BRIEF DESCRIPTION OF THE DRAWINGS

FIG. 4 is a perspective view of the left force generating unit of FIG. 2 in which the upper cylinder is partially broken away.

DETAILED DESCRIPTION OF THE PREFERRED EMBODIMENT

Figure 1:
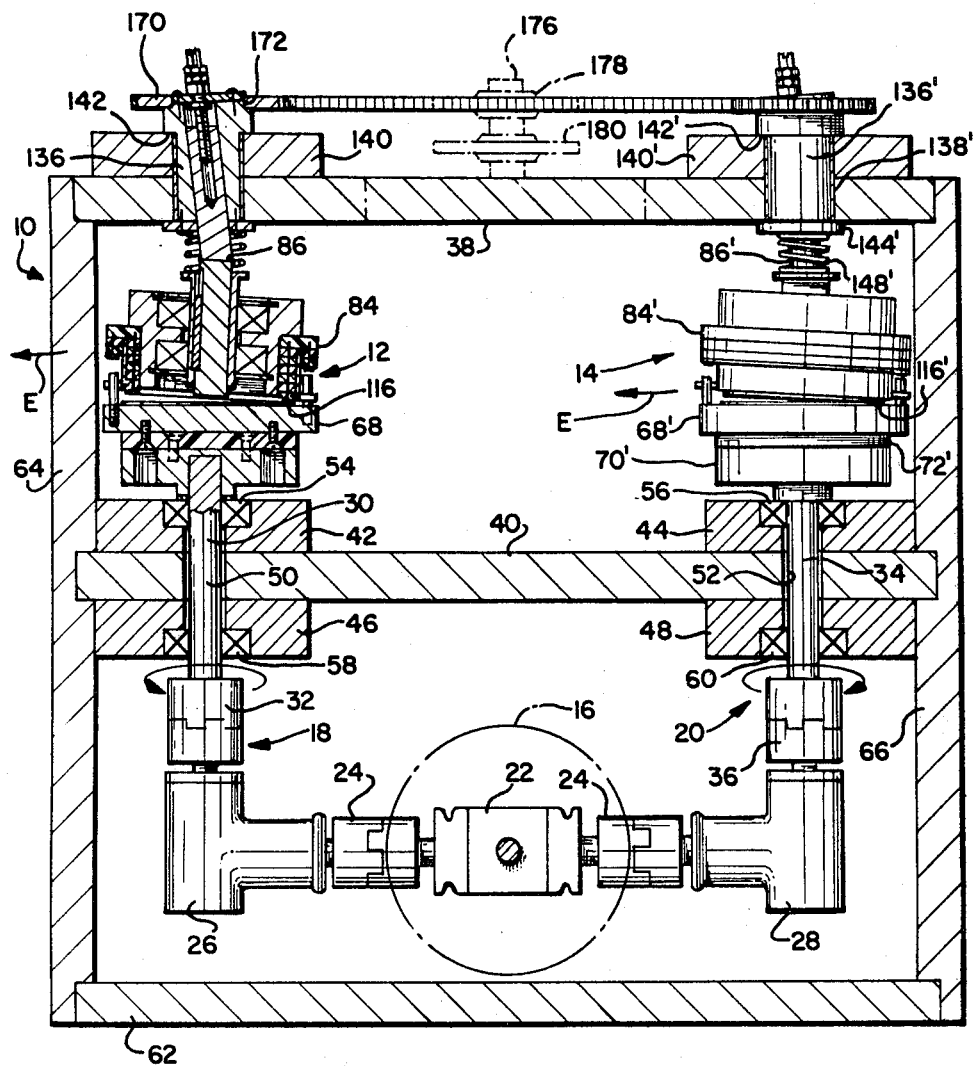
FIG. 1 is a side elevation of the present invention in which the frame and the left force generating unit are shown in section.

The propulsion system of the present invention is best shown in FIG. 1 and consists of an aluminum frame 10, left and right force generating units 12, 14, a source of motive power such as a conventional electric motor 16 (shown schematically), and left and right drive trains 18, 20. The motor 16 is of conventional design and is linked to the drive trains 18, 20 by means of a standard three-way gear drive 22. The three-way gear drive 22 drives flexible couplings 24 which in turn drive left and right right angle gear drives 26, 28. The left right angle gear drive 26 drives a first lower shaft 30 through a flexible coupling 32 and the right right angle gear drive 28 drives a second lower shaft 34 through a flexible coupling 36. As shown in FIG. 1, the first lower shaft 30 drives the left force generating unit 12 and the second lower shaft 34 drives the right force generating unit 14. The left and right right angle gear drives 26, 28 are each geared so that the left and right force generating units 12, 14 rotate in directions opposite to each other.

The left and right force generating units 12, 14 are each journaled at an upper portion into the frame 10 at an upper plate 38. The frame 10 also includes a median plate 40 to which upper blocks 42, 44 and lower blocks 46, 48 are mounted, preferably by welding. The median plate 40, upper blocks 42, 44, and lower blocks 46, 48 define passageways 50, 52 through which passes the first lower shaft 30 and second lower shaft 34, respectively. The upper blocks 42, 44 contain upper bearings 54, 56 and the lower blocks 46, 48 contain lower bearings 58, 60. Upper bearings 54 and lower bearings 58 engage the first lower shaft so that the shaft does not contact the surface defining the passageway 50 through the median plate 40 and upper and lower blocks 42, 46. Similarly, upper bearings 56 and lower bearings 60 engage the second lower shaft 34 so that it does not contact the surface defining the passageway 52 which passes through the median plate 40, upper block 44 and lower block 48.

The frame 10 also includes a base plate 62 which supports the electric motor 16 by means of a mounting plate (not shown) of conventional design. The base plate 62 preferably includes mounting means (not shown) which would be used to mount the propulsion system of the present invention to a selected apparatus. The base plate 62, median plate 40, and upper plate 38 are joined by left and right side walls 64, 66.

The construction of the left and right force generating units 12, 14 will now be described. It should be noted that the left and right force generating units 12, 14, contain identical components arranged in an identical fashion. Therefore, only the left force generating unit 12, which is shown in FIG. 2, will be described with the understanding that the description applies as well to the right force generating unit 14.

Figure 2:
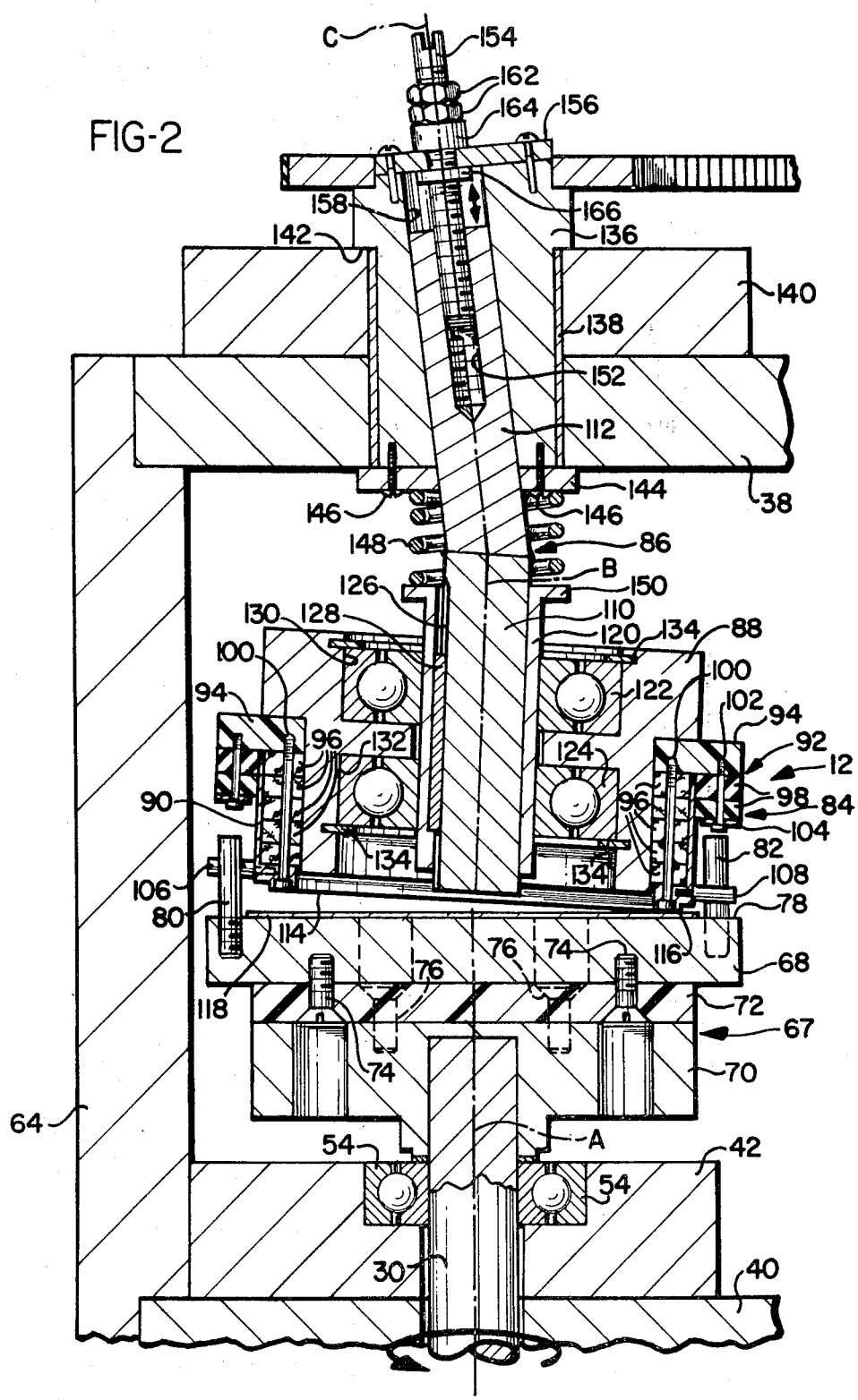
FIG. 2 is an enlarged side elevation in section of the left force generating unit of FIG. 1.

As best shown in FIG. 2, the force generating unit 12 includes a lower rotating member 67 which includes disk 68 and mounting disk 70 that is press-fitted onto an end of the first lower shaft 30. The disk 68 is separated from the mounting disk 70 by a coupling disk 72. The disk 68 is joined to the coupling disk 72 by means of upwardly extending bolts 74 which do not contact the mounting disk 70. The mounting disk 70 is attached to the coupling disk 72 by means of downwardly extending bolts 76, shown in phantom, which do not contact disk 68. Thus, the coupling disk 72, which is made of a non-metallic material such as a phenolic resin, separates disk 68 from the mounting disk 70, preferably made of aluminum, and eliminates metal-to-metal contact between the two members.

Disk 68 includes a camming surface 78 in which is threaded a pair of studs 80, 82. Preferably, the studs 80, 82 are positioned along a common diameter and are equidistant from a first axis of rotation designated by line A.

The force generating unit 12 also includes an upper member 84 which is rotatably mounted on a first upper shaft 86. The upper member 84 consists of a top cylinder member 88, a bottom cylinder member 90, and an isolating coupling 92. The isolating coupling 92 is comprised of a plurality of non-metallic elements and includes a nylon annulus 94, which is press-fitted onto the top cylinder member 88, and a plurality of rings 96 made from an insulating material such as cork, felt, or rubber. In addition, the bottom cylinder member 90 is held to the insulating rings 96 by a pair of rubber rings 98 which extend about the outer periphery of the upper portion of the bottom cylinder member.

The bottom cylinder member 90 is attached to the nylon annulus 94 by means of a nylon bolt 100 which extends through the insulating rings 96 to be threaded into the nylon annulus. The rubber rings 98 are secured to the nylon annulus 94 by bolts 102 which are threaded into the nylon annulus. A hardened retaining ring 104 is positioned beneath the rubber rings 98 so that it is engaged by the bolts 102 and acts with the bolts to clamp the rubber rings against the nylon annulus.

The bottom cylinder member 90 includes a pair of posts 106, 108 which extend outwardly from the bottom cylinder member along a radius. Preferably, the posts 106, 108 lie along a common diameter. The posts are positioned to be engaged by the studs 80, 82 so that rotation of the lower disk 68 causes a rotation of the upper cylinder 84 in the same direction and at the same angular velocity.

The upper member 84 is rotatably mounted to a lower rod portion 110 of the first upper shaft 86. The upper portion of the first upper shaft 86 comprises a bar portion 112 which has a square cross section (See FIG. 4). The first upper shaft 86 is mounted to the upper plate 38 of the frame 10 so that the lower rod portion 110 defines a central axis denoted by line B which is skewed to line A which is defined by the central axis of the first lower shaft 30. As a result, the upper member 84 is oriented at an angle to the lower disk 68 and the bottom rim 114 of the bottom cylinder member 90 contacts the camming surface 78 at a single point of contact 116. Preferably, the camming surface 78 includes a disk-shaped rubber pad 118 which is sized so that the point of contact 116 is at all times cushioned by the rubber pad.

It is preferable to skew the axis B of the lower rod portion 110 such that it makes an angle of 3° with the axis A of the lower shaft 30. It is also desirable to skew the central axis C of the bar portion 112 of the upper shaft 86 such that it makes an angle of 6° with axis A. Thus, the upper member 84 remains in a substantially fixed position above the lower member 67 as the upper shaft 86 is rotated with respect to the upper plate 38.

The lower rod portion 110 of the first upper shaft 86 is slidably engaged within a bushing 120 which in turn is press-fitted within upper and lower cylinder bearings 122 and, 124 respectively. The lower rod portion 110 includes a key slot 126 which receives a key 128 which is used to position the lower rod portion relative to the bushing 120. The upper and lower cylinder bearings 122, 124 are retained within upper and lower recesses 130, 132 respectively within the top cylinder member 88 by means of snap rings 134. In this fashion, the top cylinder member 88 and hence the isolating coupling 92 and bottom cylinder member 90, may freely rotate about the lower rod portion.

As shown in FIGS. 1 and 2, the bar portion 112 of the first upper shaft 86 slidably engages a cylindrical bearing 136. The cylindrical bearing 136 is rotatably mounted in the upper plate 38 and is enclosed by a bushing 138. The upper plate 38 is reinforced at this location by a mounting block 140 which is superimposed upon the upper plate and encloses the cylindrical bearing 136 and bushing 138. The cylindrical bearing 136 is retained within the upper plate 38 and mounting block 140 by an annular shoulder 142 which rests upon the upper surface of the mounting block, and a retaining plate 144 which abuts the lower surface of the upper plate. The retaining plate 144 is mounted to the bottom surface of the cylindrical bearing 136 by means of a pair of screws 146. The retaining plate 144 also serves as a seat for an extension spring 148 which is positioned between the retaining plate and an upper flange 150 of the bushing 120. Thus, the coiled extension spring 148 urges the bushing 120 and hence the upper cylinder 84 against the rubber pad 118 mounted on the mounting surface 78.

The bar portion 112 includes a threaded recess 152 which receives a slot-headed bolt 154. The slot-headed bolt 154 passes through a covering cap 156 which encloses a square passageway 158 sized to receive the bar portion 112. The covering cap 156 is secured to the top surface of the cylindrical bearing 136 by mounting screws 160. The bolt 154 is adjustably secured to the covering cap 156 by a pair of locknuts 162 which rest upon a washer 164 above the cap, and a flange 166 which is positioned below the cap within the passageway 158. In this fashion, the bar portion 112 of the first upper shaft 86 can be positioned linearly within the passageway 158 by turning the slot-headed bolt 154 so that it threads into or out of the threaded recess 152, then locking the threaded bolt to the covering cap 156 by means of locknut 162 and flange 166.

Similarly, the right force generating unit 14, shown in FIG. 1, includes a lower member 67' having a disk 68', mounting disk 70', and coupling disk 72' which are mounted to and driven by the second lower shaft 34. The right force generating unit 14 also includes an upper member 84' which is suspended from the upper plate 38 by means of a second upper shaft 86'. The construction of these elements are identical to the corresponding elements described above in the left force generating unit 12 and the point of contact 116' of the right upper member 84' is oriented with respect to the second upper shaft 86' in the same fashion as the point of contact 116 is oriented with respect to the first upper shaft 86 in the left force generating unit 12.

The means for suspending the upper member 84' also corresponds to that for the upper member 84 of the left force generating unit 12. Like its counterpart, the upper member 84' includes a second upper shaft 86' which slidably engages a cylindrical bearing 136' which is fitted into a bushing 138' that in turn is rotatably mounted in the upper plate 38 and a mounting block 140'. The cylindrical bushing 136' rests upon the mounting block 140' by means of an annular shoulder 142' and is clamped to the upper plate 38 by a retaining plate 144' attached to the lower part of the cylindrical bearing by means of bolts (not shown). The right force generating unit 14 also includes a coil spring 148' which pushes the upper member 84' downwardly onto the lower disk 68'.

Figure 3:
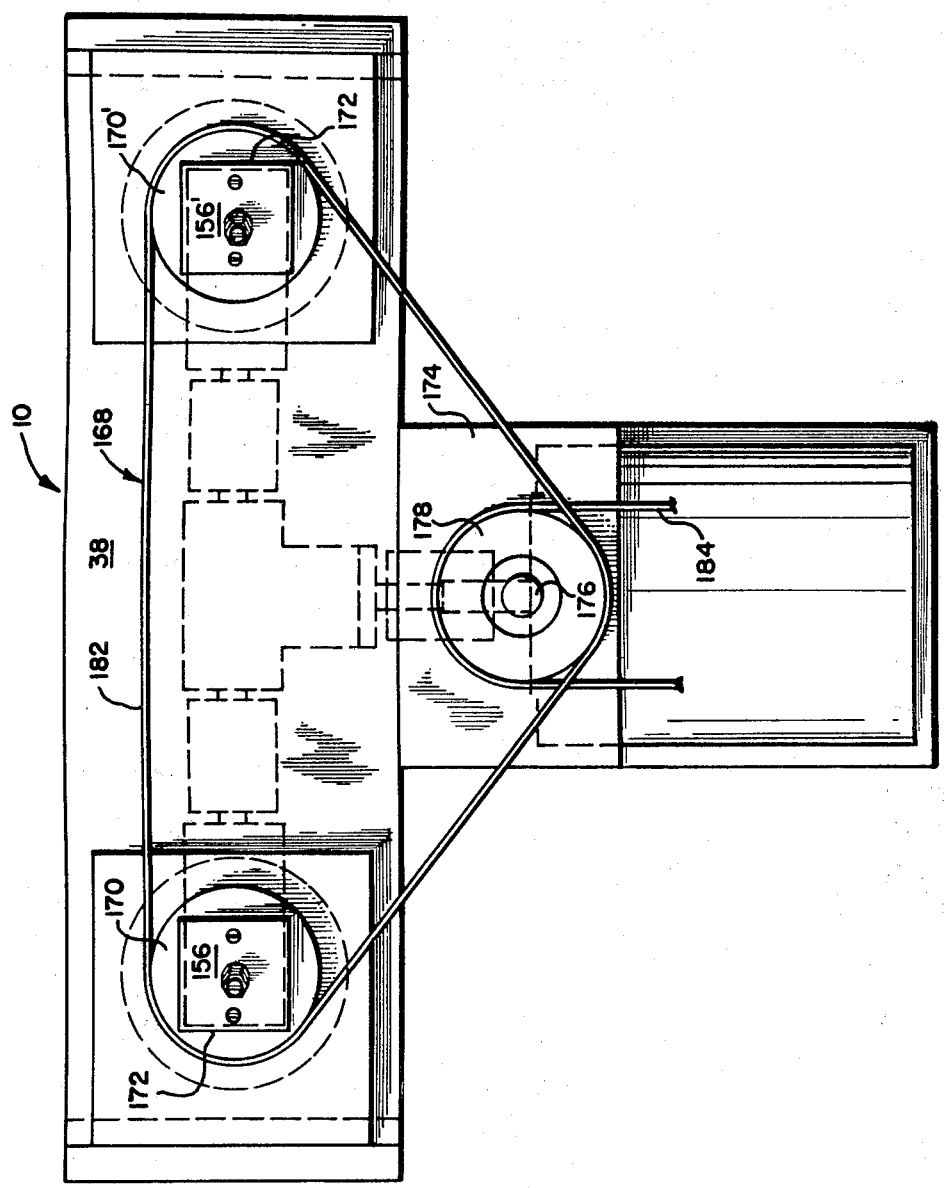
FIG. 3 is a plan view of the present invention showing the position of the motor and the steering mechanism.

As best shown in FIGS. 1 and 3, the propulsion system of the present invention includes a steering mechanism, generally designated 168. The left cylindrical bearing 136 includes a sprocket wheel 170 which is press-fitted onto a neck portion 172. Similarly, the right cylindrical bearing 136' includes a right sprocket wheel 170' which is press-fitted onto a neck portion 172'. The upper plate 38 includes a platform 174 on which is rotatably mounted an axle 176. The axle 176 is journaled into the platform 174 by bearings (not shown) of conventional design. The axle 176 includes an upper sprocket wheel 178 and lower sprocket wheel 180 which are securely mounted to the axle 176 to prevent rotation relative to each other.

The sprocket wheels 170, 170', and 178 are joined by a timing belt 182 having ribs on its inner surface which engage the sprockets of the sprocket wheels. In this fashion, the upper sprocket wheel 178 acts as a master wheel which can be turned to cause the sprocket wheels 170, 170' to rotate with it in unison. The lower sprocket wheel 180 (see FIG. 1) is driven by a steering belt 184 which can be connected to means (not shown) for rotating the upper and lower sprocket wheels about the axle 176. The means can consist of any conventional steering means such as a hydraulic or pneumatic device, a manually operated wheel, or an electrical device such as a servomotor, stepping motor, or electric solenoid.

As best shown in FIG. 1, the rotation of the upper and lower sprocket wheels 178, 180 causes the sprocket wheels 170, 170' to rotate in the same direction thereby rotating their respective first and second upper shafts 86, 86'. This causes their respective points of contact 116, 116' to change position relative to the frame 10.

The operation of the propulsion system of the present invention is shown in FIG. 4. As the lower member 67 of the left force generating unit 12 is rotated by the left drive train 18, the engagement of the studs 80 and 82 with the posts 106, 108 causes the upper member 84 to rotate about the lower rod portion 110 of the first upper shaft 86. The rotation of the lower disk 68 generates a centrifugal force represented by the vector arrow C. The superposition of the upper member 84 upon the camming surface 78 at the point of contact 116 causes an unbalanced condition upon the lower disk 68 which generates a reactive force represented by the vector arrow D which is normal to the surface of the bottom cylinder member 90. As a result of the damping qualities inherent in the isolating coupling 92 and coupling disk 72 the forces are not equal and a resultant force, represented by the vector line E results which is a unidirectional linear force. The vector arrow E extends from the point of contact 116 through a diameter of the lower disk 68. The rubber pad 118 is placed beneath the bottom cylinder member 90 to reduce noise generated by the engagement of the bottom cylinder member 90 and the lower disk 68. The point of contact 116, which remains fixed relative to the lower rod portion 110, describes a circular path on the pad 118 which is denoted by circle F in FIG. 4.

The magnitude of the resultant force, vector E can be varied by varying the output of the motor 16. The magnitude of this force is directly proportional to the rotational speed of the motor 16.

The direction of the resultant force is varied by rotating wheel 178 which in turn rotates upper shafts 86, 86' to change the location of the points of contact 116, 116' relative to the frame 10. The resultant forces, which always intersect the points 116, 116' and the central axes B, B', will likewise be rotated.

It is necessary to orient the left and right force generating units 12, 14 so that their respective first and second upper shafts 86, 86' cause the points of contact 116, 116' to create resultant forces which act in the same direction so that their effect is additive. In addition, it is necessary to provide the gearing in the left and right drive trains 18, 20 so that the lower disks 68, 68' rotate in directions opposite to each other thereby eliminating any existing rotational torques that may be generated during operation. Furthermore, in order to effectively superimpose the weight of the upper member 84 upon the lower rotating member 67, the upper member must be aligned with it so that the distance from the center line of shaft 110 to the point of contact 116 is equal to the distance from the center line of shaft 30 to the point of contact.

There are many advantages of the propulsion system of the present invention. For example, the left and right force generating units are relatively small and the top cylinder members, bottom cylinder members, lower disks, and mounting disks may be made of metal such as aluminum which provides a concentrated mass for generating a resultant force in a relatively small area, thereby eliminating the need for large spinning disks or rotating weights at the ends of rods. The resultant forces generated by the force generating units does not vary during the time of operation; the force is constant and can provide smooth propulsion for any vehicle powered by this device. In addition, the gearing required for the force generating units to be powered by the electric motor is simple in construction and requires only conventional types of gear drives and connections. There is no need for exotic gear arrangements or complex gearing.

While the form of apparatus herein described constitutes a preferred embodiment of this invention, it is to be understood that the invention is not limited to this precise form of apparatus, and that changes may be made therein without departing from the scope of the invention.

What is claimed is:

1. An apparatus for converting rotary motion into linear motion comprising:
   a frame;
   at least one lower member having a camming surface and mounted to said frame to rotate about a first axis;
   said lower member including lower non-metallic damping means isolating said camming surface from the remainder of said lower member;
   at least one upper member positioned above said lower member and mounted to said frame to rotate about a second axis skewed to said first axis;
   said upper member including a bottom rim, a portion of which engages said camming surface of said lower member at a point thereon;
   said upper member including upper non-metallic damping means isolating said bottom rim from the remainder of said upper member;
   means for rotating said lower member about said first axis; and
   means carried by said lower member for engaging and driving said upper member such that rotation of said lower member said rotating means causes said upper member to rotate about said second axis in the same direction as said lower member, thereby creating unbalanced centrifugal forces which result in a first linear force substantially normal to said first axis.

2. The apparatus of claim 1 wherein said upper member and said lower member are joined by said means for engaging and driving said upper member such that said upper member rotates at the same angular velocity as said lower member.

3. The apparatus of claim 1 wherein said portion of said bottom rim is at a radial distance from said second axis that is equal to the radial distance from said first axis to said point on said lower member.

4. The apparatus of claim 1 wherein said lower damping means comprises a plate member of a phenolic resin which supports said camming surface.

5. The apparatus of claim 1 wherein said upper member includes at least one pair of opposing post members extending outwardly from said upper member, said posts extending radially from said second axis on a common diameter.

6. The apparatus of claim 5 wherein said means for urging and driving said upper member includes at least one pair of studs extending upwardly from said camming surface and positioned thereon along a common diameter, said studs engaging said opposing post members.

7. The apparatus of claim 6 wherein said studs are positioned on said camming surface such that their radial distances to said first axis are equal.

8. The apparatus of claim 1 wherein said upper member includes:
   a top cylinder member;
   a bottom cylinder member having said bottom rim; and
   said upper damping means joins said top cylinder member to said bottom cylinder member.

9. The apparatus of claim 8 wherein said upper member includes an upper shaft rotatably mounted in said frame and having a lower portion rotatably journaled into said top cylinder member.

10. The apparatus of claim 9 further comprising means for rotating said upper shaft relative to said frame.

11. The apparatus of claim 10 wherein said means for rotating said upper shaft includes:
    bearing means for receiving an upper portion of said first upper shaft, said bearing means rotatably mounted in said frame; and
    means for rotating said bearing means.

12. The apparatus of claim 11 wherein said means for rotating said bearing means comprises:
    a sprocket wheel rigidly mounted to an upper portion of said bearing means;
    a master sprocket wheel rotatably mounted to said frame; and
    belt means extending about said sprocket wheel and said master sprocket wheel such that rotation of said master sprocket wheel causes said sprocket wheel to rotate thereby causing said upper shaft to rotate relative to said frame and said point of engagement to be revolved about said first axis.

13. The apparatus of claim 1 further comprising:
    a second lower member having a second camming surface and mounted to said frame to rotate about a third axis substantially parallel to said first axis;
    said second lower member including second lower non-metallic damping means isolating said second lower camming surface from the remainder of said second lower member;
    a second upper member positioned above said second lower member and mounted to said frame to rotate about a fourth axis substantially parallel to said second axis;
    said second upper member including a second bottom rim, a portion of which engages said second camming surface at a point thereon;
    said second upper member including second upper non-metallic damping means isolating said bottom rim of said second upper member from the remainder of said second upper member;
    means for rotating said second lower member about said third axis in a direction opposite to that of said upper member and said lower member; and
    means carried by said second lower member for engaging and driving said second upper member such that rotation of said second lower member by said rotating means causes said upper member to rotate about said second axis in the same direction as said second lower member, thereby creating unbalanced centrifugal forces which result in a second linear force.

14. The apparatus of claim 13 wherein said second upper member and said second lower member are joined by said means for engaging and driving said second upper member such that said second upper member rotates at the same angular velocity as said lower member.

15. The apparatus of claim 14 wherein said portion of said second bottom rim is at a radial distance from said fourth axis that is equal to the radial distance from said third axis to said point on said second lower member.

16. The apparatus of claim 15 wherein said second lower damping means comprises a plate made of a phenolic resin which supports said camming surface.

17. The apparatus of claim 16 wherein said second upper member includes at least one pair of opposing post members extending outwardly from said second upper member, said posts extending radially from said fourth axis on a common diameter.

18. The apparatus of claim 17 wherein said means for urging and driving said second upper member includes at least one pair of studs extending upwardly from said second camming surface and positioned thereon along a common diameter, said studs of said second lower member engaging said opposing post members of said second upper member.

19. The apparatus of claim 18 wherein said studs of said second lower member are positioned on said second camming surface such that their radial distances to said third axis are equal.

20. The apparatus of claim 19 wherein said first and second upper members each include:
  a top cylinder member;
  a bottom cylinder member having said bottom rim; and
  said first and second damping means each join one of said top cylinder members to one of said bottom cylinder members.

21. The apparatus of claim 20 wherein said first and second upper members each includes an upper shaft rotatably mounted in said frame and having a lower portion rotatably journaled into said top cylinder member.

22. The apparatus of claim 21 further comprising means for rotating said upper shafts relative to said frame.

23. The apparatus of claim 22 wherein said means for rotating said upper shafts includes:
  separate bearing means, each receiving an upper portion of one of said upper shafts, each of said bearing means rotatably mounted in said frame; and
  means for rotating said bearing means.

24. The apparatus of claim 23 wherein said means for rotating said bearing means comprises:
  sprocket wheels, each rigidly mounted to an upper portion of one of said bearing means;
  a master sprocket wheel rotatably mounted to said frame; and
  belt means extending about said sprocket wheels and said master sprocket wheel such that rotation of said master sprocket wheel causes said sprocket wheels to rotate thereby causing said upper shafts to rotate relative to said frame and said points of engagement to be revolved about said first and third axes.

* * * * *

UNITED STATES PATENT AND TRADEMARK OFFICE
CERTIFICATE OF CORRECTION

PATENT NO. : 4,409,856
DATED : October 18, 1983
INVENTOR(S) : Fred de Weaver, III It is certified that error appears in the above—identified patent and that said Letters Patent is hereby corrected as shown below:

Col. 2, line 29, "Fp = F - F" should be --Fp = F - F'--.

Col. 11, line 27, after "member" insert --by--.

Col. 11, line 44, "member" should be --made--.

Signed and Sealed this

Twentieth Day of March 1984

[SEAL]

Attest:

Attesting Officer

GERALD J. MOSSINGHOFF
Commissioner of Patents and Trademarks